US 6,696,660 B2

(12) United States Patent
Nastasi, Jr.

(10) Patent No.: US 6,696,660 B2
(45) Date of Patent: Feb. 24, 2004

(54) METHOD AND SYSTEM FOR WELD PROCESS MONITORING

(75) Inventor: John D. Nastasi, Jr., Warren, OH (US)

(73) Assignee: Electronic Data Systems Corporation, Plano, TX (US)

( * ) Notice: Subject to any disclaimer, the term of this patent is extended or adjusted under 35 U.S.C. 154(b) by 0 days.

(21) Appl. No.: 09/910,394

(22) Filed: Jul. 20, 2001

(65) Prior Publication Data

US 2003/0015501 A1 Jan. 23, 2003

(51) Int. Cl.[7] ............................................. B23K 11/24
(52) U.S. Cl. .................... 219/109; 219/86.41; 219/91.1
(58) Field of Search ........................... 219/86.41, 109, 219/110, 91.1, 119, 120; 73/1.75, 1.79

(56) References Cited

U.S. PATENT DOCUMENTS

| | | | | |
|---|---|---|---|---|
| 3,871,208 A | * | 3/1975 | Berg | .................... 73/12.13 |
| 5,563,392 A | * | 10/1996 | Brown et al. | ............ 235/91 R |
| 5,968,376 A | | 10/1999 | Shirk | ........................ 219/109 |
| 6,084,195 A | * | 7/2000 | Swaggerty et al. | ...... 219/86.41 |
| 6,184,487 B1 | * | 2/2001 | Visscher | ................... 219/91.1 |
| 6,356,808 B1 | * | 3/2002 | Stenberg | .................... 700/254 |

FOREIGN PATENT DOCUMENTS

| | | | | |
|---|---|---|---|---|
| DE | 92 05 165.0 | | 4/1992 | ........... B23K/11/36 |
| DE | 19754857 A1 | | 12/1997 | ........... B23K/9/12 |

OTHER PUBLICATIONS

V3300 Electrode Condition Sensor Installation and Maintenance Manual, part No. 97164B, REV.0., pp. 1, 3–7, 9, 11–14. 1995.*

International Search Report in International Application No. PCT/US 02/23033, dated Oct. 23, 2002, 8 pages.

V3300 Electrode Condition Sensor Installation and Maintenance Manual, part No. 97164B, Rev. 0. (13 pages) 1995.

* cited by examiner

Primary Examiner—M. Alexandra Elve
Assistant Examiner—Kevin McHenry
(74) Attorney, Agent, or Firm—Baker Botts LLP

(57) ABSTRACT

A weld tip testing head is presented. An alignment member has an aperture disposed therein and is coupled to a spring element. The spring element is further coupled to a mounting. The aperture is operable to removably receive a weld tip and the alignment member is operable to determine an alignment associated with the weld tip. Computer software is encoded on storage. The computer software is operable to receive the alignment from the alignment member and analyze the alignment with respect to at least one expected alignment value. The computer software is further operable to generate an alarm based on the analysis and generate a fault based on the analysis.

29 Claims, 2 Drawing Sheets

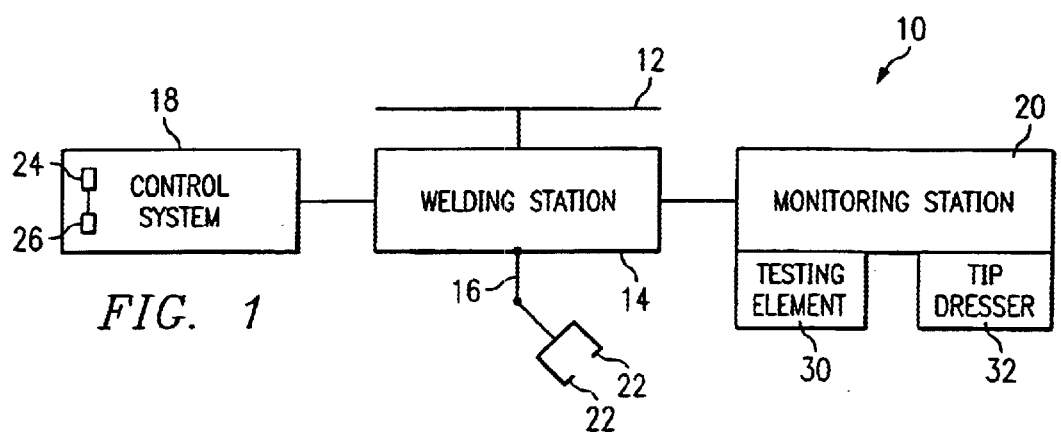
FIG. 1
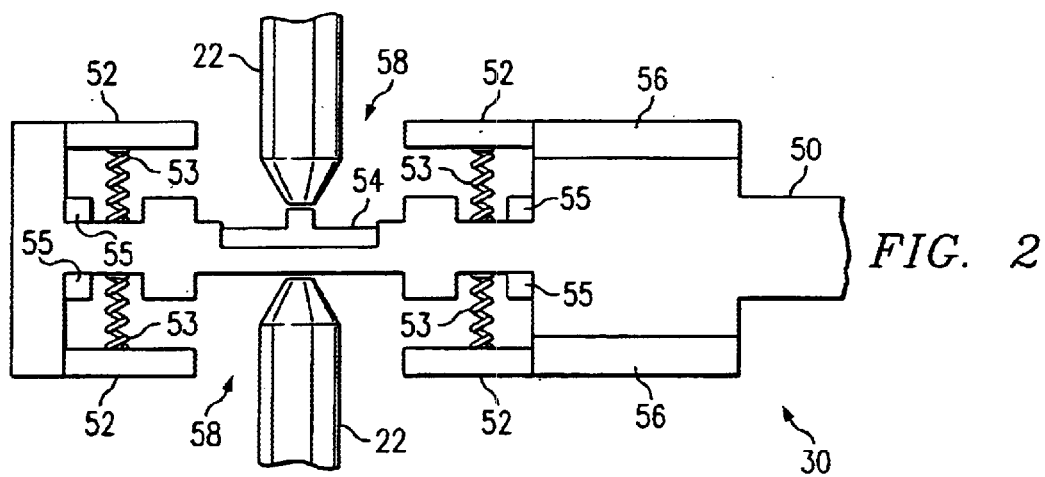
FIG. 2
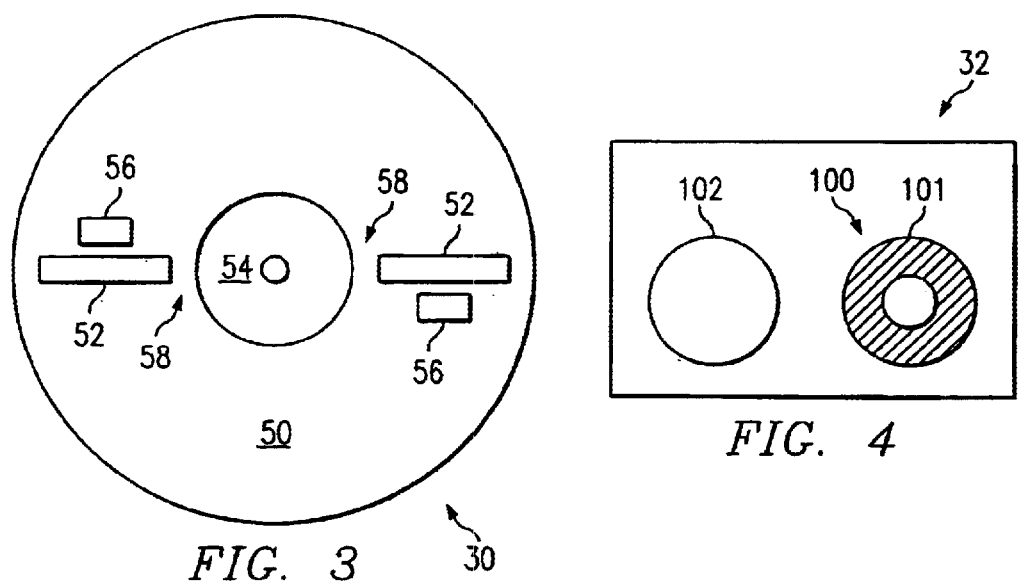
FIG. 3
FIG. 4

METHOD AND SYSTEM FOR WELD PROCESS MONITORING

TECHNICAL FIELD OF THE INVENTION

This invention relates in general to welding, and, more specifically to a method and system for weld process monitoring.

BACKGROUND OF THE INVENTION

As computers have grown increasingly important in today's society, various industries have increasingly adopted computer controlled systems for more efficient and effective control and monitoring of equipment. Industries using automatic welding have increasingly used computer controlled equipment.

Industries involved with automatic welding have turned to computer controlled machinery to increase the efficiency of assembly lines. One common operation on an assembly line is the welding together of components. The welding operation is often performed automatically by a computer-controlled welding device. Often, a determination of proper operation of the welding device is performed manually by inspecting welds after they are performed. For example, a pry test may be used to determine a bad weld that has not properly joined two elements. However, manual inspection can be undesirable as many bad welds can be created before a problem is detected.

SUMMARY OF THE INVENTION

The present invention provides an improved method and system for weld process monitoring. In one embodiment of the present invention, a weld tip testing head is described. An alignment member has an aperture disposed therein and is coupled to a spring element. The spring element is further coupled to a mounting. The aperture is operable to removably receive a weld tip and the alignment member is operable to determine an alignment associated with the weld tip. Computer software is encoded on storage. The computer software is operable to receive the alignment from the alignment member and analyze the alignment with respect to at least one expected alignment value. The computer software is further operable to generate an alarm based on the analysis and generate a fault based on the analysis.

The present invention provides numerous technical advantages. Various embodiments of the present invention may provide all, some or none of these technical advantages. One such technical advantage is the capability to detect possible welding problems before many bad welds are made. By checking various elements of the performance of the welding equipment, problems and developing problems may be more quickly detected. Early detection of problems decreases the number of bad welds and increases the productivity of, for example, an assembly line.

BRIEF DESCRIPTION OF THE DRAWINGS

The present invention is best understood from the detailed description which follows, taken in conjunction with the accompanying drawings, in which:

FIG. 1 is a block diagram illustrating a weld process monitoring system according to one embodiment of the present invention;

FIG. 2 is a side view illustrating details of a testing element associated with the monitoring system of FIG. 1 according to one embodiment of the present invention;

FIG. 3 is a top view of the testing element according to one embodiment of the present invention;

FIG. 4 is a diagram illustrating further details of a tip dresser associated with the monitoring station of FIG. 1 according to one embodiment of the present invention.

DETAILED DESCRIPTION OF THE INVENTION

Figure 5:
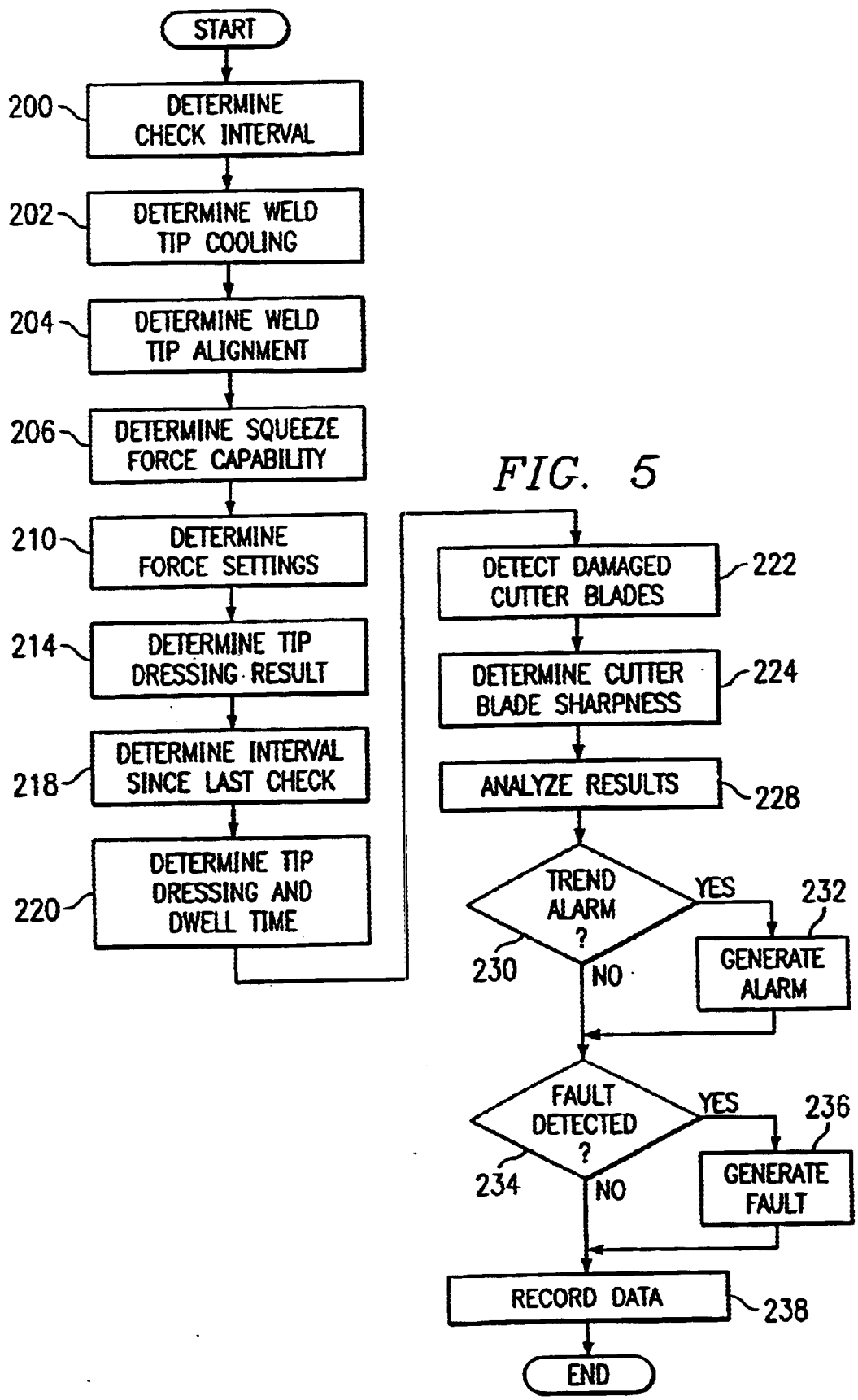
FIG. 5 is a flow chart illustrating an exemplary method of operation of the monitoring system of FIG. 1 according to one embodiment of the present invention.

FIG. 1 is a block diagram illustrating a weld process monitoring system 10. System 10 comprises an assembly line 12, a welding station 14, a weld arm 16, a control system 18, and a monitoring station 20.

Assembly line 12 comprises a suitable assembly line for placing physical items in a location accessible by welding station 14. More specifically, assembly line 12 may move physical products along a predetermined path such that welding station 14 is given suitable time to perform one or more welds on the products.

Welding station 14 comprises a station for performing automated, manually and/or partially manually controlled welding on products on assembly line 12. More specifically, welding station 14 may provide mechanical and/or logical control of welding arm 16 for welding products on assembly line 12.

Welding arm 16 comprises an articulated or non-articulated arm operable to move to weld products on assembly line 12. Welding arm 16 also comprises one or more weld tips 22.

Weld tips 22 comprise tips operable to create a weld. In one embodiment, weld tips 22 comprise copper tips used to perform resistive welding and may be water cooled or air cooled. The invention is not limited to any specific number of weld tips 22, any particular material for fabrication weld tips 22, or any kind of cooling mechanism.

Control system 18 comprises a processor 24 and/or storage 26. Processor 24 comprises a suitable general purpose or specialized data processing device, such as an application specific integrated circuit (ASIC), a field programmable gate array (FPGA), a general purpose central processing unit (CPU) or other suitable hardware operable to execute computer software stored in storage 26.

Storage 26 comprises suitable transient and/or persistent computer-readable storage, such as a computer-readable medium, either alone or in suitable combination. For example, storage 26 may comprise one or more of magnetic storage, optical storage, electronic storage, such as random access memory (RAM) and dynamic random access memory (DRAM) and other suitable physical, optical or electronic storage in suitable combination. Storage 26 is operable to store computer instructions executable by processor 24. Alternatively, the functions performed by control system 18 may be performed by a combination of hardware and software or may exist entirely in hardware.

Control system 18 is operable to assist welding station 14 in the operation and control of weld arm 16 and weld tips 22. Control system 18 is further operable to receive information from monitoring station 20 and welding station 14 for storage and analysis. For example, control system 18 may receive errors or other data generated at welding station 14 or monitoring station 20 for recording in a log on storage 26. Multiple control systems 18 can be used for different components without departing from the scope of the invention.

In addition, data associated with monitoring station 20 may be sent to one or more remote computers.

Monitoring station 20 comprises a testing element 30 and a tip dresser 32. Monitoring station 20 is operable to perform various testing and repair actions on weld tips 22.

Testing element 30 is operable to perform one or more tests on weld tips 22. For example, testing element 30 may determine weld tip cooling status, weld tip alignment, available squeeze force of weld tips 22, a pneumatic component status associated with arm 16, and force settings associated with welding station 14. Some of these tests may be omitted or other tests performed without departing from the scope of the invention. Testing element 30 is described in greater detail in association with FIGS. 2 and 3.

Tip dresser 32 is operable to repair weld tips 22. More specifically, as weld tips 22 are used to weld products on assembly line 12, weld tips 22 may become dull. Tip dresser 32 operates to sharpen weld tips 22. Tip dresser 32 is discussed in greater detail in association with FIG. 4.

In operation, products move along assembly line 12 to welding station 14. Welding station 14 then instructs weld arm 16 to create one or more welds on the product on assembly line 12. For example, arm 16 may be articulated and move weld tips 22 to the location where welds are needed. Weld tips 22 then generate welds as appropriate. In one embodiment, weld tips 22 squeeze around the desired location of the weld and then use resistive welding to generate a weld. More specifically, arm 16 may move weld tips 22 closer together so as to hold the portions of the product to be welded in a stationary and touching position while the weld is completed. After a predetermined number of jobs, welding station 14 moves weld tips 22 to monitoring station 20 (or moves monitoring station 20 to weld tips 22). At monitoring station 20, various tests are performed on weld tips 22 by testing element 30 and tip dresser 32. Welding station 14 then returns weld arm 16 and weld tips 22 to welding products on assembly line 12.

FIG. 2 is a side view illustrating details of an example of a testing element 30 constructed in accordance with the invention. FIG. 3 is a top view of testing element 30. FIGS. 2 and 3 are discussed together for increased clarity. Testing element 30 comprises a mounting 50, one or more alignment sensors 52, one or more springs 53, a pressure sensor 54, a temperature sensor 56 and an aperture 58.

Mounting 50 provides an essentially stable attachment to monitoring station 20 such that testing element 30 is relatively securely mounted to monitoring station 20. For example, mounting element 50 may comprise a steel arm. Mounting element 50 could be almost any shape and could be made of many different materials.

Alignment sensors 52 comprise elements operable to detect a misalignment of weld tips 22. In one embodiment, alignment sensors 52 comprise spring mounted members shaped like portions of a washer or an entire washer operable to move in response to contact with weld tips 22. The shape of alignment sensors 52 is relatively unimportant as is the number of alignment sensors 52. In the illustrated embodiment, a single alignment sensor 52 is located on each of opposing sides of testing element 30. However, multiple alignment sensors 52 could be included on either side of testing element 30 such that the direction of misalignment could be sensed. For example, four sensors could be placed on each side to locate misalignment in one of four quadrants. Movement of alignment sensors 52 is detectable by monitoring station 20. The particular alignment sensor 52 which is moved may also be available to monitoring station 20. Alternatively, alignment sensor 52 may comprise a laser, an infrared sensor or other suitable mechanical, electrical or optical alignment detection equipment.

Aperture 58 is disposed within alignment sensor 52 and allows insertion of weld tips 22 through alignment sensor 52. If weld tips 22 are not aligned with aperture 58, then alignment sensor 52 will be activated. The size of aperture 58 may be varied in order to set particular tolerances for the alignment of weld tips 22. For example, a three-quarter inch tip may be used with a seven-eighths inch aperture 58 so as to allow minimal tolerance for misalignment of weld tips 22.

Spring 53 comprises a compressible element coupled to alignment sensor 52 and mounting 50. Spring 53 is compressible in response to force applied to alignment sensor 52, such as when weld tip 22 comes into contact with alignment sensor 52. In one embodiment, depression of spring 53 causes generation of a piezo-electric charge which is receivable by monitoring station 20 for analysis by control system 18. In another embodiment, movement of alignment sensors 52 on springs 53 may be detected by a laser or other optical system, for example, where the movement of alignment sensor 52 breaks one or more laser beams. In general, one or more sensor elements 55 may be coupled to mounting 50 for detecting compression of alignment sensor 52. For example, sensor element 55 may comprise a laser, a piezo-electric current generator responsive to spring 53, a mechanical sensor, an optical sensor, an electronic sensor, a magnetic sensor or other suitable sensing device.

Force sensor 54 comprises a sensor element operable to measure the force exerted by weld tips 22. For example, force sensor 54 may comprise a strain gauge, a load cell, or other mechanical force sensors.

Temperature sensor 56 comprises a sensor operable to detect the temperature of welding tip 22. Temperature sensors 56 may be operable to individually determine the temperature of the one of weld tips 22 to which the temperature sensor 56 is adjacent. For example, temperature sensors 56 may detect the heat radiated by weld tips 22 as weld tips 22 are inserted into testing element 30. Infrared sensor 56 may comprise an infrared heat sensor, a thermocouple or other suitable temperature measurement equipment. As noted, one temperature sensor 56 may separately determine the temperature of an upper weld tip while a second temperature sensor 56 determines the temperature of a lower weld tip.

In operation, weld tips 22 are inserted into testing element 30 through aperture 58. If weld tips 22 are misaligned from their expected position, then weld tips 22 will impact one or more of alignment sensors 52. If alignment sensors 52 move in response to weld tips 22, then monitoring station 20 will sense a misalignment of weld tips 22. Alternatively, when alignment sensors 52 comprises optical devices, such as lasers, mis-alignment may be detected by intersection of weld tips 22 with a laser beam.

In addition, by detecting which alignment sensors 52 are moved, monitoring station 20 may be given a better idea of the nature and extent of the misalignment of weld tips 22 where multiple sensors are used on each side of testing element 30.

Temperature sensors 56 determine the current temperature of weld tips 22 and the associated data is captured by monitoring station 20. Force sensor 54 determines the amount of pressure provided by weld tips 22 and the associated data is also captured by monitoring station 20. More specifically, weld tips 22 may be inserted into aperture 58 with the same amount of speed and pressure used when weld tips 22 are welding products. After relevant measurements have been made, weld tips 22 withdrawn from testing element 30 can be moved to tip dresser 32 or can be returned to performing welding.

FIG. 4 is a diagram illustrating further details of tip dresser 32. Tip dresser 32 comprises a tip dresser element 100, a load sensor 101 and a vibration sensor 102. Tip dresser element 100 comprises an element operable to receive weld tip 22 and sharpen weld tip 22. More specifically, tip 22 is inserted in tip dresser element 100 to be sharpened. Tip dresser element 100 may use spinning blades driven by a motor to sharpen weld tips 22. Typically, the act of sharpening a weld tip 22 is referred to as "tip dressing". Tip dresser element 100 may be coupled to monitoring station 20.

Motor load current sensor 101 is coupled to tip dresser element 100 and is operable to detect the electrical current draw of the motor driving the blades of tip dresser element 100. Motor load current sensor 101 communicates the electrical current draw of the tip dresser motor to monitoring station 20.

Peak vibration accelerometer 102 detects the peak vibration of tip dresser element 100. By detecting the vibration of tip dresser element 100, peak vibration accelerometer 102 is operable to detect an unbalanced or malfunctioning tip dresser motor.

In operation, weld tips 22 are inserted into tip dresser element 100 for sharpening. Tip dresser element 100 then rotates one or more blades at an appropriate speed in order to sharpen weld tips 22. More specifically, tip dresser element 100 attempts to form a pointed tip on weld tips 22. Current sensor 101 measures the amount of electrical current drawn by a motor driving the blades and communicates the amount of electrical current drawn by the motor to control system 18 for analysis. The amount of electrical current drawn by the motor may indicate a failing motor, such as by drawing more electrical current than usual, dulled blades or other problems. Accelerometer 102 detects the amount of vibration resulting from operation of tip dresser element 100. The detected vibration levels are communicated to control system 18 for analysis. For example, increasing vibration may indicate a broken blade which is unbalancing tip dresser element 100.

FIG. 5 is a flow chart illustrating an exemplary method of operation of system 10, unless an order for the various steps is obviously required, the steps could occur in any order. The method begins at step 200, where control system 18 determines whether the check interval for weld arm 16 and weld tips 22 has been reached. In one embodiment, the check interval is reached when welding station 14 has performed a certain number of jobs, where a job comprises a certain number of welds. For example, after five jobs involving ten welds each, control system 18 may determine that the check interval has been reached and have welding station 14 move control arm 16 and weld tips 22 to monitoring station 20 for testing. Alternatively, monitoring station 20 may move to weld tips 22 or both weld tips 22 and monitoring station 20 may move.

Next, at step 202, testing element 30 determines the temperature of weld tips 22. More specifically, using temperature sensors 56, the temperature of weld tips 22 may be determined. Once the temperature of weld tips 22 is determined, the amount of cooling being provided at the weld tip may be determined by comparing the actual temperature of weld tips 22 to an expected temperature or range of temperatures for weld tips 22. Thus, malfunctions in the weld tip cooling system or defects in the weld tips 22 may be detected. More specifically, weld tips 22 may be cooled using a water cooling system where water is circulated through arm 16 to weld tips 22 to draw away heat generated during the welding process. Improper cooling of weld tips 22 may contribute to decrease the life span of weld tips 22 and increase the chance of improper welding.

At step 204, the alignment of weld tips 22 is determined by monitoring station 20. More specifically, as weld tips 22 are inserted in testing element 30, alignment sensors 52 may be moved. If the alignment sensors 52 are moved by weld tips 22, then weld tips 22 and/or arm 16 are not correctly aligned. Control system 18 and monitoring station 20 can then use this information to realign arm 16 and/or weld tips 22 and/or to inform repair personnel of the need to realign arm 16 and weld tips 22.

Proceeding to step 206, the squeeze force applied to weld tips 22 is determined. More specifically, force sensor 54 measures and records the amount of pressure exerted by weld tips 22. As weld tips 22 are used to weld products on assembly line 12, their capability to squeeze with sufficient force may decrease due to wear or other problems. Monitoring station 20 may be used to ensure that the proper squeeze force is applied to properly weld products. The measured squeeze force at sensor 54 may be communicated to monitoring station 20 for analysis at control system 18 and/or sent to remote computer systems.

Then, at step 210, weld tips 22 are moved from testing element 30 to tip dresser 32 (or tip dresser 32 is moved or weld tips 22 and tip dresser 32 are both moved). At tip dresser 32 the force setting of tip dressing element 100 is determined. More specifically, the amount of force used to spin the cutting blades of tip dresser element 100 is determined using the current measurement described above.

At step 214, accelerometer 102 is used to detect excess vibration, which could indicate a bent weld gun or bad alignment.

Next, at step 218, the interval since the last check performed by monitoring station 20 and arm 16 and weld tips 22 is determined. More specifically, control system 18 analyzes information from monitoring station 20, such as the time of the present check of arm 16 and weld tips 22, and determines if an unusual and/or unexpected amount of time has passed since the last check operation.

Proceeding to step 220, the amount of time taken by the tip dressing operation by tip dresser element 100 is determined. Then, at step 222, damaged cutter blades in tip dresser element 100 are detected based upon this time interval and/or a vibration analysis using accelerometer 102.

Then, at step 224, cutter blade sharpness is estimated. More specifically, cutter blade sharpness is estimated by analyzing the amount of time needed to sharpen the weld tip 22. Dull cutter blades may not sharpen tip 22 appropriately and/or may take an unexpected amount of time.

Then, at step 228, control system 18 analyzes the results of steps 200 through 226. More specifically, a predetermined acceptable range may be associated with each measured item, such as temperature, alignment and squeeze force. The measured value is then compared to the expected value. In addition, control system 18 may have fault ranges for the various measured elements, such as temperature, alignment and squeeze force, may be provided to system 18. Control system 18 may then compare the measured values to the fault range of values. The fault range indicates operating values of the measured elements that indicate imminent failure or serious problems.

Proceeding to decisional step 230, control system 18 determines whether an alarm should be generated. More specifically, an alarm may be a trend detected based on the analysis of the information gathered indicating that while things are currently operating within parameters that a problem may soon occur. For example, tip dresser 32 may currently be operating within acceptable operating parameters, but an analysis of tip dresser 32 may indicate that major replacement may soon be needed. Alarms may be generated using historical data and/or the currently measured data.

For another example, the measured temperature of tip dresser 22 may exceed the acceptable range of temperatures for a tip dresser 22. This information can be used by a plant manager or other administrator to schedule down time for monitoring station 20 and schedule other replacement and repair operations associated with the monitoring station 20. For another example, arm 16 and weld tips 22 may presently be operating within acceptable parameters, but analysis of the data returned by monitoring station 20 may indicate that significant work my soon be needed. If a trend is detected, then the YES branch of decisional step 230 leads to step 232.

At step 232, an alarm is generated and communicated to an appropriate person indicating the trend that has been detected. For example, probable failure in the near future may be communicated to a plant manager or operational supervisor via e-mail indicating the imminent failure and the analysis which indicated the imminent failure. The plant manager may then use the alarm to schedule maintenance so as to decrease the down time and impact of the repair. In one embodiment, the alarm includes the data which triggered the alarm. Returning to step 230, if no alarms are to be generated, then the NO branch leads to decisional step 234.

At decisional step 234, control system 18 determines whether a fault exists. Typically, a fault indicates more immediate problems than alarms. For example, imminent failure of weld tips 22 may be detected by control system 18 analyzing information from monitoring station 20. If a fault is detected by control system 18, then the YES branch of decisional step 234 leads to step 236. At step 236, a fault is generated and communicated to an appropriate person. In some embodiments, a fault may cause automatic shutdown of the welding equipment. For example, imminent failure of the cooling system for weld tips 22 may be communicated via a message sent to a plant manager. In one embodiment, the fault includes the data which triggered the fault. Returning to step 234, if no fault is detected then the NO branch of decisional 234 leads to step 238.

At step 238, control system 18 records data received from monitoring station 20 on storage 26. In one embodiment, data is recorded by control system 18 in the manner consistent with ISO 9000 procedures. The method then ends.

Other changes, substitutions, and alterations are also possible without departing from the spirit and scope of the present invention, as defined by the following claims.

What is claimed is:

1. A weld tip testing head comprising:
   a first alignment member;
   a first spring element having first and second ends, the first end coupled to the first alignment member, and the second end couple to a mounting;
   a first sensor element coupled to the mounting;
   wherein the first spring element is operable to be compressed in response to a weld tip contacting the first alignment member;
   wherein the first sensor element is operable to measure a first alignment associated with the weld tip;
   a second alignment member;
   a second spring element having first and second ends, the first end coupled to the second alignment member, and the second end coupled to the mounting;
   a second sensor element coupled to the mounting;
   wherein the second spring element is operable to be compressed in response to the weld tip contacting the second alignment member;
   wherein the first and second alignment members form an aperture operable to removably receive the weld tip; and
   wherein the second sensor element is operable to measure a second alignment associated with the weld tip.

2. A weld tip testing head comprising:
   a first alignment member;
   a first spring element coupled to the alignment member;
   the first spring element being further coupled to a mounting; and
   computer software encoded on storage;
   wherein the first alignment member is operable to determine a first alignment associated with the weld tip, wherein if the weld tip is out of alignment the first spring element is compressed; and
   wherein the computer software is operable to:
      receive the first alignment from the first alignment member;
      analyze the first alignment with respect to at least one expected alignment value;
      generate an alarm based on the analysis; and
      generate a fault based on the analysis.

3. The weld tip testing head according to claim 2, wherein the computer software is further operable to:
   generate the alarm when the first alignment is outside a range of expected alignments, the expected alignments indicating proper values for the first alignment and the alarm indicating that a problem may soon occur; and
   generating the fault when the alarm is within a range of fault alignments, the fault alignments indicating values associated serious mis-alignment of the weld tip.

4. The weld tip testing head according to claim 1, wherein the weld tip comprises a pair of weld tips and further comprising:
   a pressure sensor operable to determine a squeeze force associated with the weld tips, the pressure sensor coupled to the mounting; and
   a heat sensor operable to determine a temperature associated with the weld tip, the heat sensor coupled to the mounting.

5. The weld tip testing head according to claim 1, wherein the first alignment member comprises a washer.

6. The weld tip testing head according to claim 1, wherein the first alignment member further operates to depress in response to contact with the weld tip and wherein the first spring element causes generation of a piezo-electric charge in response to being depressed.

7. The weld tip testing head according to claim 1 and further comprising a plurality of the weld tips.

8. The weld tip testing head according to claim 1, wherein the first alignment member comprises a generally circular element and a size of an aperture disposed within the generally circular element is based on an alignment tolerance associated with the weld tip.

9. A weld process monitor comprising:
   a pressure sensor operable to determine a squeeze force associated with a weld tip, the pressure sensor coupled to a mounting;

a heat sensor operable to determine a temperature associated with the weld tip, the heat sensor coupled to the mounting;

an alignment member having an aperture disposed therein and coupled to a spring element, the spring element being further coupled to the mounting, wherein the aperture is operable to removably receive the weld tip and wherein the alignment member is operable to determine an alignment associated with the weld tip; and computer software encoded on storage and operable to:
analyze at least one of the squeeze force, the temperature and the alignment with respect to at least one expected value;
generate an alarm based on the analysis;
generate a fault based on the analysis;
wherein the alarm indicates that a problem may soon occur; and
wherein the fault indicates a serious problem.

10. The weld process monitor according to claim 9, wherein the pressure sensor comprises one of a strain gauge or a mechanical sensor and wherein the heat sensor comprises one of an infrared sensor or a thermocouple.

11. The weld process monitor according to claim 9, wherein the alignment member comprises a washer.

12. The weld process monitor according to claims wherein the computer software is further operable to:
compare one of the squeeze force, the temperature or the alignment to one of a respective range of expected squeeze forces, a range of expected temperatures or a range of expected alignments;
generate the alarm when one of the squeeze force, the temperature or the alignment exceeds one of the range of respective expected squeeze forces, expected temperatures or expected alignments, the alarm including one of the squeeze force, the temperature or the alignment and one of the range of expected squeeze forces, expected temperatures or expected alignments; and
communicate the alarm to an appropriate recipient.

13. The weld process monitor according to claim 9, wherein the computer software is further operable to:
compare one of the squeeze force, the temperature or the alignment to one of a range of fault squeeze forces, a range of fault temperatures or a range of fault alignments;
generate the fault when one of the squeeze force, the temperature or the alignment is respectively within one the range of fault squeeze forces, the range of fault temperatures or the range of fault alignments, the fault including at least one of the squeeze force, the temperature and the alignment and at least one of the range of fault squeeze forces, the range of fault temperatures and the range of fault alignments; and
communicate the fault to an appropriate recipient.

14. The weld process monitor according to claim 9, wherein the alignment member is operable to determine the alignment of the weld tip in response to the weld tip touching the alignment member and moving the alignment member on the spring element.

15. The weld process monitor according to claim 14, wherein the alignment member further operates to depress in response to contact with the weld tip and wherein the spring element causes generation of a piezo-electric charge in response to being depressed.

16. The weld process monitor according to claim 15, wherein movement of the alignment member is detected by a laser.

17. The weld process monitor according to claim 9, and further comprising a plurality of the weld tips.

18. The weld process monitor according to claim 9, wherein the alignment member comprises a generally circular element and a size of the aperture is based on an alignment tolerance associated with the weld tip.

19. The weld process monitor according to claim 9, wherein the aperture is generally circular.

20. A method for weld process monitoring comprising:
determining an alignment of a weld tip;
analyzing the alignment with respect to at least one expected value for the alignment;
generating an alarm based on the analysis;
generating a fault based on the analysis;
wherein the alarm indicates that a problem may soon occur; and
wherein the fault indicates a serious problem.

21. The method according to claim 20, wherein determining the alignment of the weld tip comprises detecting movement of an alignment sensor by the weld tip and communicating the alignment to a control system.

22. The method for weld process monitoring according to claim 20 and further comprising:
determining a temperature of the weld tip;
determining a squeeze force capacity of the weld tip; and
analyzing the temperature and the squeeze force with respect to at least one expected value.

23. The method according to claim 22, wherein determining the temperature of the weld tip comprises measuring the heat radiated from the weld tip using an infrared sensor and communicating the temperature to a control system.

24. The method according to claim 22, wherein determining the squeeze force comprises measuring the pressure of the weld tip at a strain gauge in response to impact of the weld tip against the strain gauge and communicating the squeeze force to a control system.

25. The method according to claim 21, wherein analyzing the alignment comprises comparing the alignment to a range of expected alignments.

26. The method according to claim 21, wherein the analysis further comprises comparing one of the squeeze force, the temperature or the alignment to one of a respective range of expected squeeze forces, expected temperatures or expected alignments, and wherein generating the alarm further comprises:
generating the alarm when one of the squeeze force, the temperature or the alignment exceeds one of the range of respective expected squeeze forces, expected temperatures or expected alignments, the alarm including one of the squeeze force, the temperature or the alignment and one of the range of expected squeeze forces, expected temperatures or expected alignments; and
communicating the alarm to an appropriate recipient.

27. The method according to claim 21, wherein the analysis further comprises comparing one of the squeeze force, the temperature or the alignment to one of a range of fault squeeze forces, a range of fault temperatures or a range of fault alignments, and wherein generating the fault further comprises:
generating the fault when one of the squeeze force, the temperature or the alignment is respectively within one the range of fault squeeze forces, the range of fault temperatures or the range of fault alignments, the fault including at least one of the squeeze force, the temperature and the alignment and at least one of the range of fault squeeze forces, the range of fault temperatures and the range of fault alignments; and communicating the fault to an appropriate recipient.

28. The method according to claim 27, wherein the appropriate recipient comprises a system administrator.

29. A weld tip testing head comprising:

a first alignment member;

a first spring element coupled to the first alignment member;

the first spring element being further coupled to a first face of a mounting;

a first sensor element coupled to the first face of the mounting;

wherein the first spring element is operable to be compressed in response to a first weld tip contacting the first alignment member;

wherein the first sensor element is operable to determine a first alignment associated with the first weld tip;

a second alignment member;

a second spring element coupled to the second alignment member;

the second spring element being further coupled to the first face of the mounting;

a second sensor element coupled to the first face of the mounting;

wherein the second spring element is operable to be compressed in response to the first weld tip contacting the second alignment member;

wherein the second sensor element is operable to determine a second alignment associated with the first weld tip;

wherein the first and second alignment members form an aperture operable to removably receive the first weld tip;

a third alignment member;

a third spring element coupled to the third alignment member;

the third spring element being further coupled to a second face of the mounting;

a third sensor element coupled to the second face of the mounting;

wherein the third spring element is operable to be compressed in response to a second weld tip contacting the third alignment member;

wherein the third sensor element is operable to determine a third alignment associated with the second weld tip;

a fourth alignment member;

a fourth spring element coupled to the fourth alignment member;

the fourth spring element being further coupled to the second face of the mounting;

a fourth sensor element coupled to the second face of the mounting;

wherein the fourth spring element is operable to be compressed in response to the second weld tip contacting the fourth alignment member;

wherein the fourth sensor element is operable to determine a fourth alignment associated with the second weld tip; and wherein the third and fourth alignment members define a second aperture operable to receive the second weld tip.

* * * * *